[19] United States Patent
Inadome

[11] Patent Number: 4,963,006
[45] Date of Patent: Oct. 16, 1990

[54] ZOOM LENS WITH INNER OR REAR FOCUSING SYSTEM

[75] Inventor: Kiyotaka Inadome, Kawasaki, Japan

[73] Assignee: Nikon Corporation, Tokyo, Japan

[21] Appl. No.: 203,639

[22] Filed: Jun. 3, 1988

Related U.S. Application Data

[63] Continuation-in-part of Ser. No. 136,918, Dec. 22, 1987, abandoned.

[30] Foreign Application Priority Data

Dec. 26, 1986 [JP] Japan ................... 61-312978
Jun. 4, 1987 [JP] Japan ................... 62-138998

[51] Int. Cl.$^5$ .............................................. G02B 15/14
[52] U.S. Cl. .................................................. 350/427
[58] Field of Search ................ 350/423, 427, 429, 428

[56] References Cited

U.S. PATENT DOCUMENTS 4,627,691 12/1986 Tomori ........................ 350/429
4,681,406 7/1987 Naito et al. ................... 350/429
4,830,475 5/1989 Ishiyama et al. ............... 350/427

FOREIGN PATENT DOCUMENTS 57-4018 of 1982 Japan .
58-202416 of 1983 Japan .
58-211117 of 1983 Japan .
58-211118 of 1983 Japan .

Primary Examiner—Scott J. Sugarman
Attorney, Agent, or Firm—Shapiro and Shapiro

[57] ABSTRACT

A zoom lens includes a plurality of lens units movable along the optic axis, and a mechanism for prescribing the movements of the plurality of lens units along the optic axis and making the focal length of the zoom lens adjustable within a desired range. At least one of the plurality of lens units is moved along the optic axis to form the image of an obect lying at any distance from the zoom lens on a predetermined surface. The mechanism has a member formed with at least one slot which prescribes the movement of the at least one lens unit along the optic axis. The at least one lens unit is moved in accordance with the at least one slot both when it is moved along the optic axis to change the focal length of the zoom lens and when it is moved along the optic axis to form the image of the object on the predetermined surface.

11 Claims, 7 Drawing Sheets

ZOOM LENS WITH INNER OR REAR FOCUSING SYSTEM

This is a continuation-in-part application of U.S. Ser. No. 136,918 filed Dec. 22, 1987, now abandoned.

BACKGROUND OF THE INVENTION

1. Field of the Invention

This invention relates to a zoom lens, and in particular to the focusing system thereof and to the so-called inner focus or rear focus system by movement of the lens units other than the lens unit (forward group) positioned most adjacent to the object side in a lens system comprised of a plurality of lens units.

2. Related Background Art

In recent years, various systems other than the so-called forward group axial movement system (wherein the forward group most adjacent to the object side is moved to accomplish the in-focus) have been proposed in order to achieve, high performance and high magnification change in zoom lenses.

In the forward group axial movement in-focus system, the lens unit moved for the in-focus is most adjacent to the object side, and this leads to the tendency of the effective aperture of the in-focus lens unit becoming very great, and for example, where the design is such that automatic focusing by a mechanism such as a motor or the like is accomplished, the moving mechanism for the in-focus unit becomes bulky, and this has been disadvantageous for automatic focusing. In contrast, where the focusing systems other than the forward group axial movement system are generally adopted, the amount of movement for the in-focus varies in conformity with a variation in the focal length, and this has led to the problem that the focusing mechanism becomes very complex and structurally difficult.

As a solution to this problem, there has been proposed a construction as disclosed in Japanese Laid-Open Patent Application No. 4018/1982 wherein a new cam for focusing which operatively associates a zooming mechanism with a focusing mechanism is provided to thereby structurally enable focusing even if the amount of axial movement varies in conformity with a variation in the focal length.

On the other hand, as an entirely different solution, there is a construction in which the lateral magnification of the in-focus unit varies with zooming so that the amount of axial movement of the in-focus unit is substantially constant irrespective of the focal length. As an example of this, there is a construction as disclosed in Japanese Laid-Open Patent Application No. 202416/1983 wherein three in-focus units are moved as a unit, discretely from during zooming, and substantially by the same amount for any focal length, to thereby enable the in-focus to be accomplished, and there are constructions as disclosed in Japanese Laid-Open Patent Application Nos. 211117/1983 and 211118/1983 wherein two in-focus units are moved at different ratios discretely from zooming, to thereby enable the in-focus to be accomplished.

As the systems other than the forward group axial movement system, the above-described focusing systems may all be said to be systems of high realizability which solve the various problems peculiar to the focusing by the axial movement of the forward group. However, in any of these systems, the movement of the in-focus unit during focusing differs from the movement of the in-focus unit during zooming and therefore, it is necessary to provide an entirely different mechanism for enabling focusing and thus, the construction has unavoidably been complex.

SUMMARY OF THE INVENTION

It is therefore an object of the present invention to provide a zoom lens system in which the in-focus by a system other than the forward group axial movement can be accomplished by a simple construction.

To achieve the above object, the present invention prescribes, in a zoom lens system having a plurality of lens units movable on the optic axis for a magnification change, that the plurality of lens units for a magnification change include an in-focus unit comprising at least one lens unit movable on the optic axis for the in-focus as well, and the in-focus unit is moved on a common locus during zooming and during focusing.

The movement of the in-focus unit is prescribed by at least one cam slot formed in a rotatable lens barrel to be described. It is to be understood that the cam slot of the rotatable lens barrel may be one which extends through the rotatable lens barrel or one which does not extend through the rotatable lens barrel.

More specifically, the zoom lens system of the present invention has at least three lens units which contribute to a magnification change during zooming, and the in-focus unit $G_F$ (see FIG. 1) comprises a plurality of lens units $G_i$ and $G_{i+1}$ other than the lens unit which is most adjacent to the object side, and the in-focus lens units $G_i$, $G_{i+1}$ are moved on their movement locuses $G_i(\theta)$ and $G_{i+1}(\theta)$, respectively, for a magnification change, thereby accomplishing the in-focus to a short distance object. When the predetermined movement locuses for a magnification change of the at least three lens units which contribute to a magnification change are expressed with the angle of rotation $\theta$ of the rotatable lens barrel formed with the cam for prescribing the direction and amount of movement of each lens unit along the optic axis as a variable, it is desirable that the amount of rotative movement $\phi$ of the in-focus lens unit for the in-focus on the movement locus for a magnification change be made equal to a predetermined object distance in any magnification-changed state (any focal length).

DESCRIPTION OF THE PREFERRED EMBODIMENTS

Figure 1:
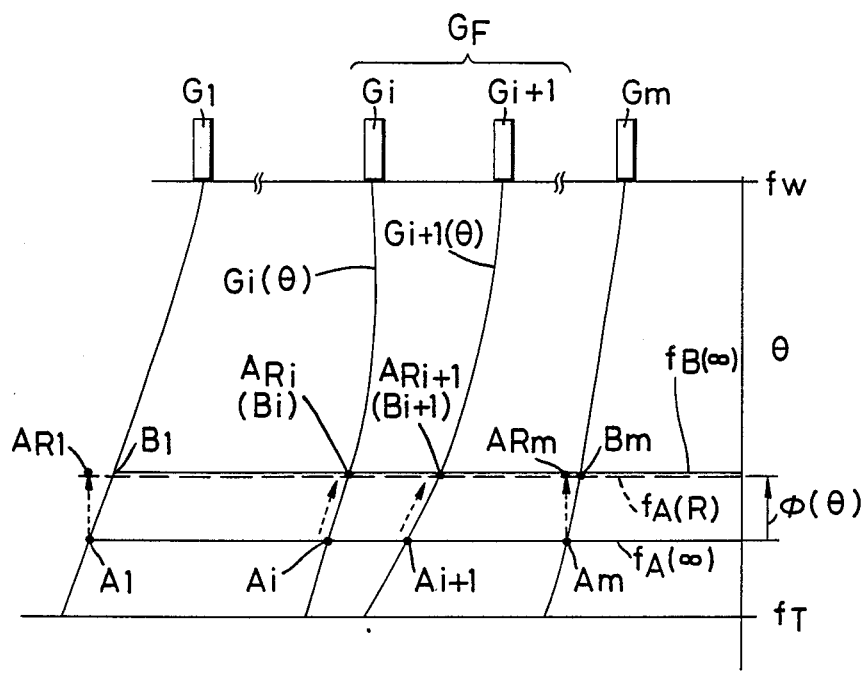
FIG. 1 illustrates the basic principle of a zoom lens system according to the present invention.

The construction shown in FIG. 1 will hereinafter be described in detail. This construction comprises m lens units constituting a lens system, and only a first lens unit $G_1$ positioned most adjacent to the object side, lens units $G_i$ and $G_{i+1}$ in the lens system as in-focus unit $G_F$, and the mth unit $G_m$ as the final unit are shown. These units have their positions on the optic axis lying at $A_1$, $A_i$, $A_{i+1}$ and $A_m$ in the infinity in-focus state in an arbitrary focal length state fA. In order to be focused to an object at a photographing distance R in this magnification-changed state, the lens units $G_i$ and $G_{i+1}$ as the in-focus unit $G_F$ are moved along their respective movement locuses $G_i(\theta)$ and $G_{i+1}(\theta)$ for a magnification change and moved to positions $A_{Ri}$ and $A_{Ri+1}$. At this time, the first lens unit $G_1$ has its position on the optic axis fixed, and in FIG. 1, that position is shown as a position $A_{R1}$ (the position on the optic axis is coincident with $A_1$), and likewise, the mth lens unit $G_m$ has its position on the optic axis fixed, and in FIG. 1, that position is shown as a position $A_{Rm}$ (the position on the optic axis is coincident with $A_m$).

On the other hand, in the infinity in-focus state in the focal length state of a certain focal length fB, all the shown lens units are moved along their respective movement locuses, and their respective positions on the optic axis are $B_1$, $B_i$, $B_{i+1}$ and $B_m$. At this time, the positions of the lens units $G_i$ and $G_{i+1}$ as the in-focus unit $G_F$ on the optic axis are coincident with the on-axis position when in said focal length fA, the lens has been focused to the object at the photographing distance R. For the lens to be further focused to a short distance object in the magnification-changed state in such a focal length fB, the lens units $G_i$ and $G_{i+1}$ as the in-focus unit $G_F$ can be moved along their respective movement locuses and the on-axis positions of the other lens units can be fixed.

The in-focus unit $G_F$ is not limited to the shown lens units $G_i$ and $G_{i+1}$, but may be constructed by adding thereto lens units other than the lens unit most adjacent to the object side, for example, the mth unit $G_m$ as the final lens unit.

As described above, the in-focus unit movable on the optic axis for the in-focus is moved on a common locus during zooming and during focusing and therefore, a so-called cam cylinder as a rotatable lens barrel for prescribing the movement locus for a magnification change can be used in common as a member for controlling the movement for the in-focus and thus, the structure of the lens barrel is very simple. Moreover, the in-focus is accomplished by the lens units within or rearward of the lens system other than the lens unit in the zoom lens system which is positioned most adjacent to the object side and therefore, the in-focus lens system can be constructed compactly and the mechanism for automatic in-focus can be made simple.

The basic construction of such a zoom lens system according to the present invention will hereinafter be described in detail.

First, consider as a popular in-focus system a case where the in-focus unit comprises m lens units.

Figure 2:
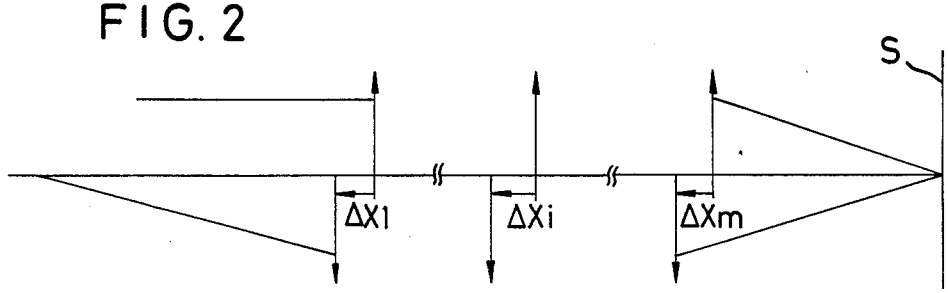
FIGS. 2 to 5 are illustrations for explaining the relation of the in-focus in a case where the in-focus system is comprised of m lens units, FIG. 2 showing the manner of in-focus of the lens system comprising m lens units, FIG. 3 showing the manner of in-focus in the mth lens unit as the final lens unit, FIG. 4 showing the manner of in-focus in any lens unit of the second to (m−1)th lens units, and FIG. 5 showing the manner of in-focus in a first lens unit positioned most adjacent to the object side.

It is to be understood that as shown in FIG. 2, the respective units are moved from the state of the infinite object distance by $\Delta X_1, \ldots, \Delta X_i, \ldots, \Delta X_m$, whereby the lens is focused to an object at the photographing distance R (the distance from the object to a predetermined image surface S).

Figure 3:
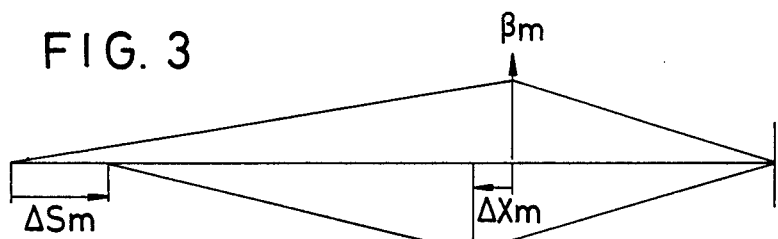

Here, when as shown in FIG. 3, the object point of the mth unit $G_m$ has been moved toward the image side by $\Delta S_m$, where the in-focus is attained with the mth unit $G_m$ moved toward the object side by $\Delta X_m$, the following relation is established.

$$\Delta S_m = \Delta X_m \left\{ \frac{1}{\beta_m 2(1 - \Delta X_m/\beta_m \cdot f_m)} - 1 \right\} \quad (1)$$

where
$\beta_m$: the lateral magnification when the object distance of the mth unit is infinity
$f_m$: the focal length of the mth unit.

Figure 4:
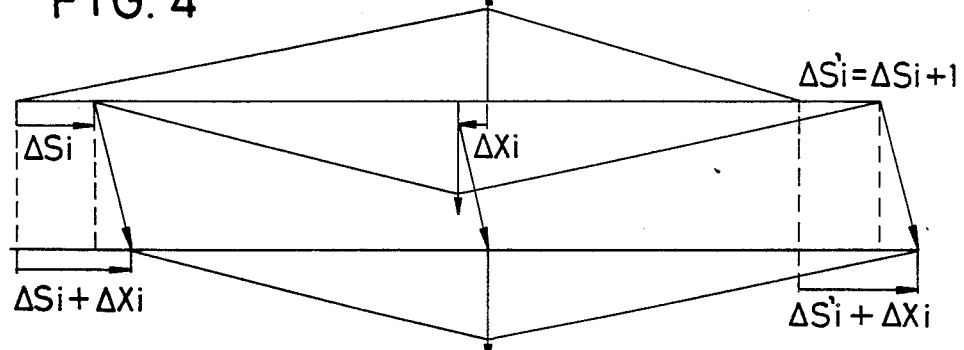

The (m−1)th unit to the second unit will now be considered with reference to FIG. 4. Assuming that as regards any ith unit $G_i$ of these units, the ith unit $G_i$ has been moved toward the object side by $\Delta X_i$ so that the image point moves by $\Delta S'_i$ when the object point relative to this unit has moved toward the image side by $\Delta S_i$, the following relation is established:

$$\Delta S_i + \Delta X_i = \frac{\Delta S'_i + \Delta X_i}{\beta_i 2 \left(1 - \frac{\Delta S'_i + \Delta X_i}{\beta_i \cdot f_i}\right)} \quad (2)$$

where $2 \leq i \leq m-1$
$\beta_1$: the lateral magnification when the object distance of the ith unit is infinity
$f_i$: the focal length of the ith unit.

Figure 5:
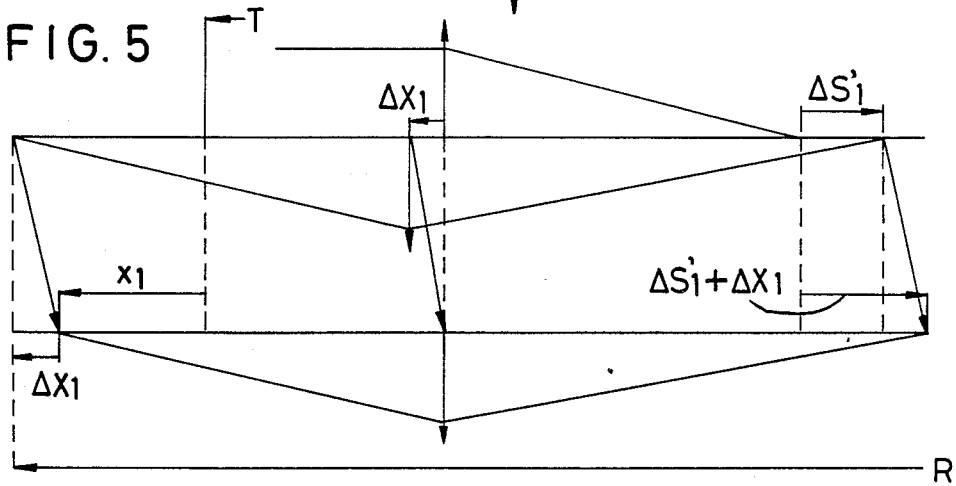

The first unit $G_1$ positioned most adjacent to the object side will now be considered with reference to FIG. 5.

When the distance from the forward focus to the object point of the first unit $G_1$ is $X_1$ and the distance from the rearward focus to the image point of the first unit $G_1$ is $x_1'$ the following is established:

$$x_1' = \Delta S_1' + \Delta X_1 = \Delta S_2 + \Delta X_1$$

$$x_1 = -(R - T - \Delta X_1)$$

where
R: the photographing distance
T: the distance from the forward focus of the first unit to the image point by the final unit.

If these values are substituted into the so-called Newton's expression $$x_1 \cdot x_1 = -f^2$$

and it is assumed that the object is not extremely near and it is supposed that $$R - T - \Delta X_1 \approx R - T,$$

then the following relation is obtained:

$$(R - T)\left\{ \frac{\Delta S'_2 + \Delta X_2}{\beta_2^2\left(1 - \frac{\Delta S'_2 + \Delta X_2}{\beta_2 \cdot f_2}\right)} - \Delta X_2 + \Delta X_1 \right\} = f_1^2 \quad (3)$$

On the other hand, when the amount of variation in the lateral magnification of the ith unit $G_i$ is minute as compared with the lateral magnification $\beta_i$ of this unit, that is when $$|\beta_i| >> \left| \frac{\Delta S'_i + \Delta X_i}{f_i} \right|,$$

the above equation (2) can be approximated as follows:

$$\Delta S_i = \frac{\Delta S'_i + \Delta X_i}{\beta_i^2} - \Delta X_i \quad (4)$$

$$(2 \leq i \leq m - 1)$$

Likewise, when the amount of variation in the lateral magnification of the mth unit $G_m$ as the final unit is minute as compared with the lateral magnification $\beta_m$ of this unit itself, that is, when $$|\beta_m| >> \left| \frac{\Delta X_m}{f_m} \right|,$$

equation (1) can be approximated as follows:

$$\Delta S_m = \Delta X_m \left( \frac{1}{\beta_m^2} - 1 \right) \quad (5)$$

Here, from the definition of the light ray pursint expression, $$S_i' = S_{i+1}$$

and if equations (4) and (5) are used, equation (3) becomes the following equation (6):

$$(R - T)\{\beta_2\beta_3 2\Delta X_1 + (1 - \beta_2 2)\beta_3 2\Delta X_2 + (1 - \beta_3 2)\Delta X_3 + \Delta S_3'\} = f_1 2\beta_2 2\beta_3 2 \quad (6)$$

If up to the (m−1)th unit are calculated on the basis of the relation as described above, the following equation (7) is obtained:

$$(R - T)\left\{ \sum_{j=1}^{m}\left[ \Delta x_j(1 - \beta_j 2) \prod_{i=j+1}^{m} \beta_i^2 \right] \right\} = f_1^2 \prod_{i=2}^{m} \beta_i^2 \quad (7)$$

where $\beta_1 = 0$.

Also, when the amount of axial movement of a particular unit during focusing is $\Delta X$, equation (7) can be modified as follows:

$$(R - T) \cdot \Delta X = \frac{f_1^2 \prod_{i=2}^{m} \beta_i^2}{\sum_{j=1}^{m}\left[ \kappa_j(1 - \beta_j^2) \prod_{i=j+1}^{m} \beta_i^2 \right]} \quad (8)$$

where $\kappa_j$: the ratio of the amount of axial movement to the particular moved unit $\beta_1 = 0$.

The above equations (7) and (8) are the relation for the in-focus when the focusing unit comprises m lens units.

A description will now be given of the case of the present invention where the in-focus units movable during focusing are moved along their own movement locuses for a magnification change.

Now, the locus along which any lens unit $G_i$ (the first unit) in the zoom lens system is moved during zooming as shown in FIG. 1 is defined as $G_i(\theta)$ with the angle of rotation $\theta$ of the rotatable lens barrel for prescribing the amount of movement of this lens unit in the direction of the optic axis as a variable.

Regarding this locus, the following equation (9) is defined:

$$\frac{d}{d\theta} G_i(\theta) = g_i(\theta) \quad (9)$$

$\Delta X_j$ in the aforementioned equation (7) can be converted to equation (10) by the use of equation (9).

$$\Delta X_j = \int_{\theta}^{\theta'} g_j(\theta)d\theta \quad (10)$$

If equation (7) is re-written by the use of equation (10), it can be converted to the following equation (11):

$$(R - T)\left\{ \sum_{j=1}^{m}\left[ \int_{\theta}^{\theta'} g_j(\theta)d\theta \cdot (1 - \beta_j^2(\theta)) \cdot \prod_{i=j+1}^{m} \beta_i^2(\theta) \right] \right\} = f_1^2 \prod_{j=2}^{m} \beta_j^2(\theta) \quad (11)$$

Where, as in the present invention, focusing is effected by the utilization of the movement curve in zooming, i.e., the cam formed on the rotatable lens barrel rotatively operated for zooming, if the movable units for a magnification change are all moved as the focusing unit, there arises the contradiction that at any focal length, the imaging positions must be the same in both of the infinite object distance and the finite distance R. Accordingly, it is necessary to set a lens unit exclusively for use for zooming which does not contribute to focusing. On the other hand, where the high magnification or the automatic in-focus of the zoom lens is contemplated as previously described, the conventional forward unit axial movement system results not only in bulkiness of the lens system, but also in a great load applied to the drive system during focusing.

Accordingly, at least the first lens unit adjacent to the object side must be set as a lens unit exclusively for use for a magnification change which does not contribute to focusing. From what has been described above, $$\int_{\theta}^{\theta'} g_j(\theta) d\theta = 0$$

is given as a relation which characterizes the focusing of the zoom lens according to the present invention, whereby following equation (12) is obtained:

$$(R - T) \left\{ \sum_{j=2}^{m} \left[ \int_{\theta}^{\theta'} g_j(\theta) d\theta \cdot (1 - \beta_j^2(\theta)) \cdot \prod_{i=j+1}^{m} \beta_i^2(\theta) \right] \right\} = f_1^2 \prod_{j=2}^{m} \beta_j^2(\theta)$$

where $\theta' = \theta + \phi(\theta)$.

Here, $\phi(\theta)$ is the amount of variation in the direction of rotation which depends on the amount of axial movement by focusing, and can generally be regarded as a function of $\theta$.

As described above, equation (12) is the basic equation of the present invention which effects focusing by the utilization of a zoom cam, but generally $\phi$ depends on $\theta$ and therefore, unless there is provided a special mechanical mechanism which will vary the value of $\phi(\theta)$ of the respective lens units, the imaging position will change if zooming is effected from a state in which the lens is focused to a finite distance object at a certain focal length to thereby change the focal length. Accordingly, the movement locus (the movement curve) of each lens unit which contributes to a magnification change must be chosen so that $\phi$ is constant. Accordingly, the above equation (12) can be written as:

$$(R - T) \left\{ \sum_{j=2}^{m} \left[ \int_{\theta}^{\theta + \phi} g_j(\theta) d\theta \cdot (1 - \beta_j^2(\theta)) \cdot \prod_{i=j+1}^{m} \beta_i^2(\theta) \right] \right\} = f_1^2 \prod_{j=2}^{m} \beta_j^2(\theta) \quad (13)$$

If the variation in the full length of the lens by zooming, i.e., the variation in the value of T, is small as compared with the photographing distance R, R−T=constant can be given. Here, consider a case where $$\int_{\theta}^{\theta + \phi} g_j(\theta) d\theta = L_j(\text{constant}),$$

that is, the movement locus during the zooming of the in-focus unit is a linear function of $\theta$.

At this time, equation (13) becomes as follows:

$$(R - T) \left\{ \sum_{j=2}^{m} \left[ L_j(1 - \beta_j^2(\theta)) \cdot \prod_{i=j+1}^{m} \beta_i^2(\theta) \right] \right\} = f_1^2 \prod_{j=2}^{m} \beta_j^2(\theta)$$

This may be modified into:

$$R - T = \frac{f_1^2 \prod_{j=2}^{m} \beta_j^2(\theta)}{\sum_{j=2}^{m} \left[ L_j(1 - \beta_j^2(\theta)) \cdot \prod_{i=j+1}^{m} \beta_i^2(\theta) \right]} = \text{constant}$$

It is assumed that $L_j$=constant, and therefore, generally, $$\sum_{j=2}^{m} \left[ L_j(1 - \beta_j^2(\theta)) \cdot \prod_{i=j+1}^{m} \beta_i^2(\theta) \right] \neq \kappa \prod_{j=2}^{m} \beta_j^2(\theta) \quad (12)$$

$\kappa$: constnat

Here, it is assumed that $R - T$=constant, and therefore the value of $f_1^2$ must vary with zooming. That is, it is necessary that the lens unit adjacent to the object side which does not contribute to focusing be comprised of at least two units and the composite focal length thereof vary with zooming.

The case where $$\int_{\theta}^{\theta + \phi} g_j(\theta) d\theta \neq L_j$$

will now be studied. In this case, even if $f_1^2$=constant, there exists the value of $$\int_{\theta}^{\theta + \phi} g_j(\theta) d\theta$$

which satisfies $$R - T = \frac{f_1^2 \prod_{j=2}^{m} \beta_j^2(\theta)}{\sum_{j=2}^{m} \left[ \int_{\theta}^{\theta + \phi} g_j(\theta) d\theta (1 - \beta_j^2(\theta)) \cdot \prod_{i=j+1}^{m} \beta_i^2(\theta) \right]}$$

but the value is very much limited and reduces the degree of freedom of zooming. Accordingly, again in this case, it is desirable to set $f_1^2$ so as to be varied by zooming. That is, it is desirable that the composite focal length of the units exclusively for use for a magnification change which are positioned more adjacent to the object side than the in-focus unit vary with the magnification change.

If, as described above, the composite focal length of the lens units adjacent to the object side which do not contribute to focusing varies with zooming, a movement curve which will make $\phi$ prescribing the amount of movement of the in-focus unit in focusing constant relative to the rotation of the rotatable lens barrel can be chosen. In such case, even if zooming is effected from a state in which the lens is focused to a finite object at any focal length, the imaging position will not change, and to prescribe such movement of each lens unit, there may be a rotatable lens barrel as a so-called cam cylinder in which the movement locus for a magnification change is set, and therefore it becomes unnecessary to provide any special mechanism.

Accordingly, equation (13) may finally be rewritten into the following equation (14):

$$(R - T)\left\{ \sum_{j=2}^{m} \left[ \int_{\theta}^{\theta + \phi} g_j(\theta)d\theta \cdot (1 - \beta_j^2(\theta)) \cdot \prod_{i=j+1}^{m} \beta_i^2(\theta) \right] \right\} = f_T^2(\theta) \prod_{j=2}^{m} \beta_j^2(\theta) \quad (14)$$

Thus, the zoom lens of the present invention has at least two magnification changing lens units more adjacent to the object side than the in-focus lens unit, and the composite focal length varies with zooming, and by adopting the movement curve of zooming which satisfies equation (14) in the in-focus lens units, the in-focus can be accomplished by intactly utilizing the zoom cam without the necessity of providing any special mechanism even if the amounts of axial movement of the respective in-focus lens units vary independently and with zooming.

Equation (14) is a relation including the approximation and therefore, actually, it is possible and ideal to effect numerical value processing and obtain a stricter movement curve.

[Embodiment]

A description will hereinafter be given of the solution of the paraxial area as an embodiment of the zoom lens system according to the present invention.

Figure 6A:
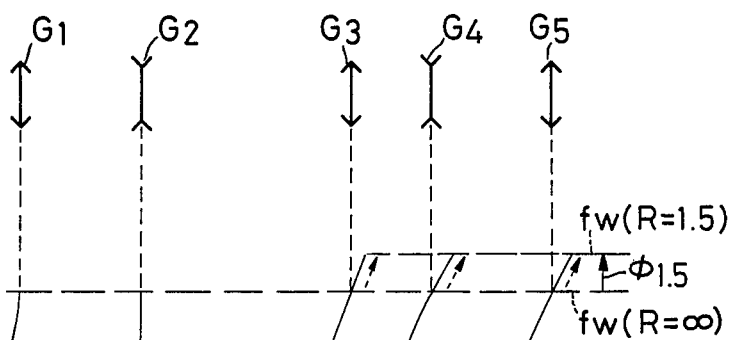
FIG. 6A shows the power arrangement of a zoom lens according to an embodiment of the present invention.

This embodiment has a focal length range of 28.7 mm–131 mm, and as shown in FIG. 6A, is a zoom lens system comprising five positive, negative, positive, negative and positive lens units in succession from the object side. The first lens unit $G_1$ of positive refractive power and the second lens unit $G_2$ of negative refractive power are lens units which are moved only during zooming and fixed during focusing and are not concerned in the in-focus, and they change their relative position during a magnification change and change their composite focal length. The third lens unit $G_3$ of positive refractive power, the fourth lens unit $G_4$ of negative refractive power and the fifth lens unit $G_5$ of positive refractive power are in-focus lens units, and are moved independently of one another during zooming, and are moved on their zooming movement curves during focusing, whereby the in-focus is accomplished.

Figure 6B:
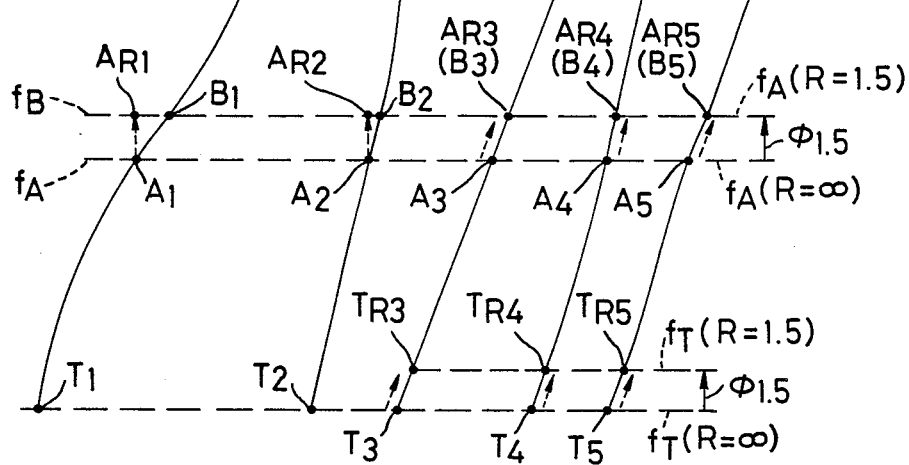
FIG. 6B is a developed view of a rotatable lens barrel in the embodiment of the present invention.

A specific form of movement of the present embodiment will now be described in detail with reference to FIG. 6B. FIG. 6B is a developed view of the rotatable lens barrel, in which the solid lines indicate the cam slots of respective lens units formed in the rotatable lens barrel. In FIG. 6B, the vertical direction corresponds to the angle of rotation $\theta$ of the rotatable lens barrel for prescribing the amount of movement of each lens unit, and the horizontal direction corresponds to the position on the optic axis, and the cam slot of each lens unit corresponds to the movement locus of each lens unit. During zooming, all the lens units are moved on the optic axis, and the first lens unit $G_1$ positioned most adjacent to the object side and the second lens unit $G_2$ positioned next thereto are moved only for zooming, and the third lens unit $G_3$, the fourth lens unit $G_4$ and the fifth lens unit $G_5$ are moved as an in-focus unit $G_F$ during focusing. In the infinity in-focus state in any focal length state fA, the five lens units have their positions on the optic axis lying at $A_1$, $A_2$, $A_3$, $A_4$ and $A_5$, respectively, and in order that the lens system may be focused to an object at the photographing distance R in this magnification-changed state, the third lens unit $G_3$, the fourth lens unit $G_4$ and the fifth lens unit $G_5$ as the in-focus unit $G_F$ are moved along their respective movement locuses for a magnification change, and thus moved to positions $A_{R3}$, $A_{R4}$ and $A_{R5}$, respectively. At this time, the first lens unit $G_1$ has its position on the optic axis fixed, and in FIG. 6B, this position is shown as a position $A_{R1}$ (the position on the optic axis is coincident with $A_1$), and likewise, the second lens unit $G_2$ has its position on the optic axis fixed, and in FIG. 6B, this position is shown as a position $A_{R2}$ (the position on the optic axis is coincident with $A_2$).

The positions $A_{R3}$, $A_{R4}$ and $A_{R5}$ of the third lens unit $G_3$, the fourth lens unit $G_4$ and the fifth lens unit $G_5$, respectively, in the short distance in-focus state are coincident with the positions $B_3$, $B_4$ and $B_5$ on the optic axis in the infinity in-focus state in the magnification-changed state of a certain focal length fB, and at this time, the position of the first lens unit $G_1$ on the optic axis is $B_1$ on the movement locus thereof and the position of the second lens unit $G_2$ on the optic axis is $B_2$ on the movement locus thereof. In such a magnification-changed state at the focal length fB, the third lens unit $G_3$, the fourth lens unit $G_4$ and the fifth lens unit $G_5$ as the in-focus unit $G_F$ are moved along their respective movement locuses and the first lens unit $G_1$ and the second lens unit $G_2$ have their on-axis positions fixed, whereby the lens system can be focused to a shorter distance object.

Likewise, when the composite focal length of the entire system is at the longest focal length $f_T$ (telephoto end), the positions of the respective lens units lie at $T_1$, $T_2$, $T_3$, $T_4$ and $T_5$ shown, and in order that in this magnification-changed state, the lens system may be focused to the object at the photographing distance R, the third lens unit $G_3$, the fourth lens unit $G_4$ and the fifth lens unit $G_5$ as the in-focus unit $G_F$ may be moved to positions $T_{R3}$, $T_{R4}$ and $T_{R5}$ along their movement locuses for a magnification change.

In this regard, the amount of rotation $\phi$ of the rotatable lens barrel for imparting the necessary movements to the third lens unit $G_3$, the fourth lens unit $G_4$ and the fifth lens unit $G_5$ as the in-focus unit in order that shift may be made from the infinity in-focus state in any magnification-changed state to the in-focus state with respect to a predetermined short distance object is designed so as to be always constant over the full magnification change range for a predetermined photographing distance R. In FIG. 6, this value is shown as a constant $\phi_{1.5}$ in the sense of the necessary amount of rotation for the photographing distance R=1.5 m.

In FIG. 6B, as regards the movement locuses of the third lens unit $G_3$, the fourth lens unit $G_4$ and the fifth lens unit $G_5$, in order to secure the movement locuses necessary for focusing at the wide angle end (the composite focal length $f_w$ of the entire system), the locus for the in-focus has been extended along each movement locus for a magnification change, and this partial locus is determined so that in the other magnification-changed states, it is equal to the amount of rotation $\phi$ of the in-focus unit necessary during focusing, and only this extended portion is the movement locus exclusively for the in-focus.

Numerical values indicative of the movement locus corresponding to the embodiment shown in FIG. 6B are shown in Table 1 below. This movement locus represents the paraxial solution of the present embodiment solved with respect to the photographing distance R=1.5 m. $D_{12}$ represents the spacing between the principal points of the first lens unit $G_1$ and the second lens unit $G_2$, $D_{23}$ represents the spacing between the principal points of the second lens unit $G_2$ and the third lens unit $G_3$, $D_{34}$ represents the spacing between the principal points of the third lens unit $G_3$ and the fourth lens unit $G_4$, $D_{45}$ represents the spacing between the principal points of the fourth lens unit $G_4$ and the fifth lens unit $G_5$, Bf represents the back focal length, TL represents the sum of the spacings between the principal points from the first lens unit $G_1$ to the image surface, and values at eight positions in the focal length f=28.7–131.0 mm are shown.

Also, the amounts of axial movement necessary for the respective lens units in the photographing distance R=1.5 m, 2.0 m, 3.0 m, 5.0 m, 7.0 m, 10.0 m by this paraxial solution are shown in Table 2 below. The amounts of axial movement in the respective photographing distances are determined from the movement locuses by a common value $\phi_R$ which depends only on the photographing distance R irrespective of the focal length. In Table 2, the amount $\phi_R$ corresponding to the angle of rotation of the rotatable lens barrel which prescribes the amount of movement for each photographing distance R is shown as a value for the total amount of rotation $\theta$ of the rotatable lens barrel necessary for the magnification change from the wide angle end to the telephoto end. Here, the case where the movement for the in-focus is on the object side is shown as the positive. The present embodiment is not a paraxial solution which satisfies condition (14), but a paraxial solution obtained by a stricter method.

With regard to such an embodiment of the present invention, the amounts of displacement of the imaging point when a predetermined amount of axial movement has been imparted to each lens unit to attain the in-focus to said respective photographing distances are shown in Table 3 below. It is seen from this Table 3 that the amounts of displacement of the imaging point at the respective focal lengths and photographing distances are very small and are sufficiently within the depth of focus.

| f | $D_{12}$ | $D_{23}$ | $D_{34}$ | $D_{45}$ | Bf | TL |
|---|---|---|---|---|---|---|
| 28.7 | 10.4245 | 36.9923 | 10.7655 | 11.2000 | 52.9000 | 122.2823 |
| 35.0 | 11.3180 | 32.1379 | 10.8320 | 9.4708 | 61.2133 | 124.9720 |
| 50.0 | 17.2933 | 26.1570 | 13.8598 | 6.5586 | 69.1817 | 133.0504 |
| 70.0 | 28.0507 | 22.7855 | 16.0062 | 4.8544 | 73.0713 | 144.7681 |
| 85.0 | 33.7726 | 20.9948 | 16.8619 | 4.2264 | 75.7067 | 151.5624 |
| 105.0 | 36.4467 | 18.6459 | 17.9664 | 3.9991 | 84.2082 | 161.2663 |
| 125.0 | 37.7323 | 16.8778 | 19.6949 | 2.2705 | 91.7892 | 168.3652 |
| 131.0 | 38.6825 | 16.4882 | 19.7194 | 2.2461 | 93.5996 | 170.7358 |

Focal lengths of respective lens units
1st lens unit $G_1$: $f_1 = 92.000$
2nd lens unit $G_2$: $f_2 = -16.700$
3rd lens unit $G_3$: $f_3 = 26.000$
4th lens unit $G_4$: $f_4 = -39.500$
5th lens unit $G_5$: $f_5 = 60.000$

TABLE 2

(Amount of axial movement of each lens unit for in-focus)
unit: mm

| R | f | $G_1$ | $G_2$ | $G_3$ | $G_4$ | $G_5$ | $\phi R/\theta$ |
|---|---|---|---|---|---|---|---|
| 1.5 m | 28.7 | 0.0000 | 0.0000 | −1.3646 | −1.3646 | −1.3646 | $3.3353 \times 10^{-2}$ |
| | 35.0 | 0.0000 | 0.0000 | −1.3646 | −1.1872 | −1.5284 | |
| | 50.0 | 0.0000 | 0.0000 | −1.3646 | −0.8051 | −1.5693 | |
| | 70.0 | 0.0000 | 0.0000 | −1.3646 | −0.7064 | −1.1218 | |
| | 85.0 | 0.0000 | 0.0000 | −1.3646 | −1.0644 | −1.3237 | |
| | 105.0 | 0.0000 | 0.0000 | −1.3646 | −1.1599 | −1.3510 | |
| | 125.0 | 0.0000 | 0.0000 | −1.3646 | −1.1839 | −1.3639 | |
| | 131.0 | 0.0000 | 0.0000 | −1.3646 | −1.3646 | −1.3646 | |
| 2.0 m | 28.7 | 0.0000 | 0.0000 | −1.0104 | −1.0133 | −1.0240 | $2.483 \times 10^{-2}$ |
| | 35.0 | 0.0000 | 0.0000 | −1.0104 | −0.8643 | −1.1097 | |
| | 50.0 | 0.0000 | 0.0000 | −1.0104 | −0.5934 | −1.1634 | |
| | 70.0 | 0.0000 | 0.0000 | −1.0104 | −0.5317 | −0.8304 | |
| | 85.0 | 0.0000 | 0.0000 | −1.0104 | −0.8042 | −0.9866 | |
| | 105.0 | 0.0000 | 0.0000 | −1.0104 | −0.8518 | −1.0059 | |
| | 125.0 | 0.0000 | 0.0000 | −1.0104 | −0.8901 | −1.0099 | |
| | 131.0 | 0.0000 | 0.0000 | −1.0104 | −1.0167 | −1.0104 | |
| 3.0 m | 28.7 | 0.0000 | 0.0000 | −0.6661 | −0.6707 | −0.6874 | $1.637 \times 10^{-2}$ |
| | 35.0 | 0.0000 | 0.0000 | −0.6661 | −0.5599 | −0.7181 | |
| | 50.0 | 0.0000 | 0.0000 | −0.6661 | −0.3874 | −0.7621 | |
| | 70.0 | 0.0000 | 0.0000 | −0.6661 | −0.3570 | −0.5486 | |
| | 85.0 | 0.0000 | 0.0000 | −0.6661 | −0.5386 | −0.6515 | |
| | 105.0 | 0.0000 | 0.0000 | −0.6661 | −0.5562 | −0.6657 | |
| | 125.0 | 0.0000 | 0.0000 | −0.6661 | −0.5960 | −0.6658 | |
| | 131.0 | 0.0000 | 0.0000 | −0.6661 | −0.6712 | −0.6662 | |
| 5.0 m | 28.7 | 0.0000 | 0.0000 | −0.3966 | −0.4008 | −0.4164 | $0.974 \times 10^{-2}$ |
| | 35.0 | 0.0000 | 0.0000 | −0.3966 | −0.3286 | −0.4215 | |
| | 50.0 | 0.0000 | 0.0000 | −0.3966 | −0.2279 | −0.4491 | |
| | 70.0 | 0.0000 | 0.0000 | −0.3966 | −0.2159 | −0.3276 | |
| | 85.0 | 0.0000 | 0.0000 | −0.3966 | −0.3238 | −0.3871 | |

TABLE 2-continued (Amount of axial movement of each lens unit for in-focus)
unit: mm

| R | f | $G_1$ | $G_2$ | $G_3$ | $G_4$ | $G_5$ | $\phi R/\Theta$ |
|---|---|---|---|---|---|---|---|
|  | 105.0 | 0.0000 | 0.0000 | −0.3966 | −0.3283 | −0.3971 |  |
|  | 125.0 | 0.0000 | 0.0000 | −0.3966 | −0.3593 | −0.3964 |  |
|  | 131.0 | 0.0000 | 0.0000 | −0.3966 | −0.3988 | −0.3966 |  |
| 7.0 m | 28.7 | 0.0000 | 0.0000 | −0.2824 | −0.2859 | −0.2990 | $0.694 \times 10^{-2}$ |
|  | 35.0 | 0.0000 | 0.0000 | −0.2824 | −0.2325 | −0.2984 |  |
|  | 50.0 | 0.0000 | 0.0000 | −0.2824 | −0.1614 | −0.3180 |  |
|  | 70.0 | 0.0000 | 0.0000 | −0.2824 | −0.1549 | −0.2337 |  |
|  | 85.0 | 0.0000 | 0.0000 | −0.2824 | −0.2314 | −0.2752 |  |
|  | 105.0 | 0.0000 | 0.0000 | −0.2824 | −0.2329 | −0.2829 |  |
|  | 125.0 | 0.0000 | 0.0000 | −0.2824 | −0.2573 | −0.2823 |  |
|  | 131.0 | 0.0000 | 0.0000 | −0.2824 | −0.2835 | −0.2834 |  |
| 10.0 m | 28.7 | 0.0000 | 0.0000 | −0.1972 | −0.2000 | −0.2102 | $0.485 \times 10^{-2}$ |
|  | 35.0 | 0.0000 | 0.0000 | −0.1972 | −0.1617 | −0.2075 |  |
|  | 50.0 | 0.0000 | 0.0000 | −0.1972 | −0.1122 | −0.2211 |  |
|  | 70.0 | 0.0000 | 0.0000 | −0.1972 | −0.1088 | −0.1635 |  |
|  | 85.0 | 0.0000 | 0.0000 | −0.1972 | −0.1620 | −0.1919 |  |
|  | 105.0 | 0.0000 | 0.0000 | −0.1972 | −0.1622 | −0.1976 |  |
|  | 125.0 | 0.0000 | 0.0000 | −0.1972 | −0.1805 | −0.1972 |  |
|  | 131.0 | 0.0000 | 0.0000 | −0.1972 | −0.1977 | −0.1973 |  |

TABLE 3

(Amount of displacement of the imaging point)
Unit: mm

| f | R |  |  |  |  |  |
|---|---|---|---|---|---|---|
|  | 1.5 m | 2.0 m | 3.0 m | 5.0 m | 7.0 m | 10.0 m |
| 28.7 | 0.0000 | −0.0046 | −0.0047 | −0.0031 | −0.0022 | −0.0015 |
| 35.0 | 0.0000 | −0.0064 | −0.0076 | −0.0058 | −0.0045 | −0.0033 |
| 50.0 | 0.0000 | −0.0241 | −0.0336 | −0.0293 | −0.0238 | −0.0182 |
| 70.0 | 0.0354 | −0.0189 | −0.0455 | −0.0442 | −0.0370 | −0.0288 |
| 85.0 | 0.0000 | −0.0418 | −0.0565 | −0.0479 | −0.0386 | −0.0293 |
| 105.0 | −0.0001 | 0.0258 | 0.0292 | 0.0212 | 0.0160 | 0.0115 |
| 125.0 | 0.0393 | −0.0007 | −0.0291 | −0.0346 | −0.0306 | −0.0247 |
| 131.0 | 0.0000 | 0.0000 | 0.0000 | 0.0000 | 0.0000 | 0.0000 |

In the above-described embodiment, the amount of movement of the third lens unit $G_3$ during focusing, like the amount of rotation $\phi_R$ of the rotatable lens barrel which prescribes the amount of movement for focusing, is constant at any focal length f for the same photographing distance R, but in the present invention, $\phi_R$ should only be constant as previously mentioned, and the design may also be such that the amount of movement of each lens unit during focusing changes with a variation in the focal length. In the above-described embodiment, the design is such that in order to focus the lens to the infinity from short distance in any focal length state, the in-focus lens units are all moved on the movement locus toward the wide angle end, but the direction of movement for the in-focus is determined by the composite focal length $f_F$ of the in-focus lens unit and the magnification $\beta_F$ borne by the in-focus lens units, and there may also exist a solution in which the in-focus lens unit is moved on the movement locus toward the telephoto end.

As described above, according to the present invention, the in-focus is accomplished by means other than the axial movement of the forward group, and the movement locus of the in-focus unit during focusing is identical to the movement locus during zooming and therefore, there is achieved a zoom lens system which does not require the provision of any special mechanism for prescribing the amount of movement for focusing, but enables the in-focus to be accomplished by a simpler construction. Where such a zoom lens system is used as a lens for an automatic focusing apparatus, it becomes possible to realize zooming and focusing by a simple mechanism.

Now, in the above-described embodiment, when the amount of rotation $\phi$ of the in-focus lens unit for the in-focus is constant in any magnification-changed state (any focal length), the amount of movement on the optic axis has been primarily determined from the movement locus for a magnification change. Therefore, the degree of freedom of designing is low and it is difficult to form a practical locus as a cam for a magnification change, and this leads to a complicated construction.

So, an improved example of the above-described embodiment will now be shown. In the improved example, lens units having different amounts of movement for a predetermined object distance in any magnification-changed state (any focal length) are provided in an in-focus lens unit comprising a plurality of lens units.

Figure 7:
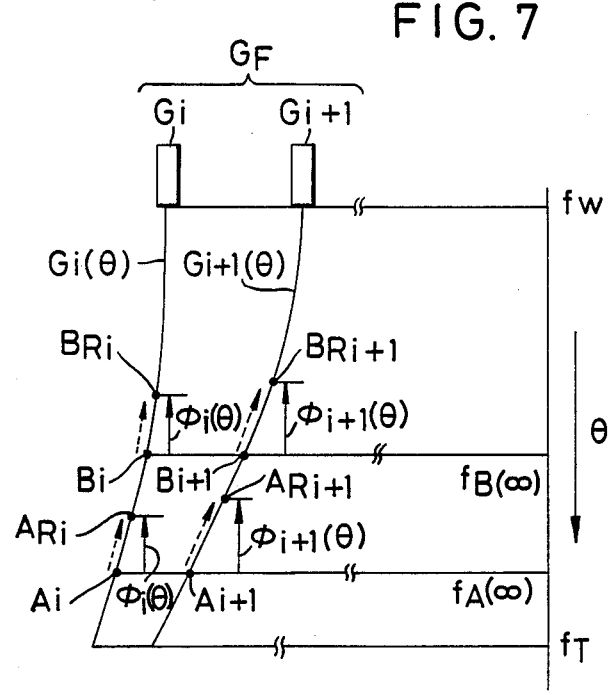
FIG. 7 shows the principle of an improved embodiment of the present invention.

The principle of the improved example will hereinafter be described with reference to FIG. 7. As described in connection with FIG. 1, it is to be understood that the lens system comprises m lens units and that there are a first lens unit $G_1$ positioned most adjacent to the object side, lens units $G_i$ and $G_{i+1}$ in the lens system as an in-focus unit $G_F$, and the mth unit $G_m$ as the final unit. The first lens unit $G_1$ and the mth lens unit $G_m$ are omitted in FIG. 7. These units have their respective positions on the optic axis lying at $A_1$, $A_i$, $A_{i+1}$ and $A_m$ in the infinity in-focus state in any focal length state fA, and in order that in this magnification-changed state, the lens system may be focused to an object at the photographing distance R, the lens units $G_i$ and $G_{i+1}$ as the in-focus unit $G_F$ are moved toward the wide angle side along their respective movement locuses $G_i(\theta)$ and $G_{i+1}(\theta)$ for a magnification change, and moved to positions $A_{Ri}$ and $A_{Ri+1}$, respectively. At this time, the first lens unit $G_1$ and the mth lens unit $G_m$ have their positions on the optic axis fixed in the same manner as shown in FIG. 1.

On the other hand, in the infinity in-focus state in the focal length state of a certain focal length fB, the first, the ith, the (i+1)th and the mth lens unit are moved along their respective movement locuses, and their positions on the optic axis are $B_1$, $B_i$, $B_{i+1}$ and $B_m$. For the lens system to be further focused to a short distance object in such a magnification-changed state at the focal length fB, the lens units $G_i$ and $G_{i+1}$ as the in-focus unit $G_F$ can be moved toward the wide angle side along their respective movement locuses for a magnification change and the positions of the other lens units on the optic axis can be fixed.

Of course, when with the photographing distance R fixed, zooming is effected along the respective movement locuses from the positions $A_{R1}$, $A_{Ri}$, $A_{Ri+1}$ and $A_{Rm}$, the respective lens units may be moved to positions $B_{R1}$, $B_{Ri+1}$ and $B_{Rm}$.

Again in the improved example, the in-focus unit $G_F$ is not limited to the lens units $G_i$ and $G_{i+1}$ shown, but may also be constructed by adding lens units other than the lens unit most adjacent to the object side, for example, the mth unit $G_m$ as the final lens unit.

Figure 8:
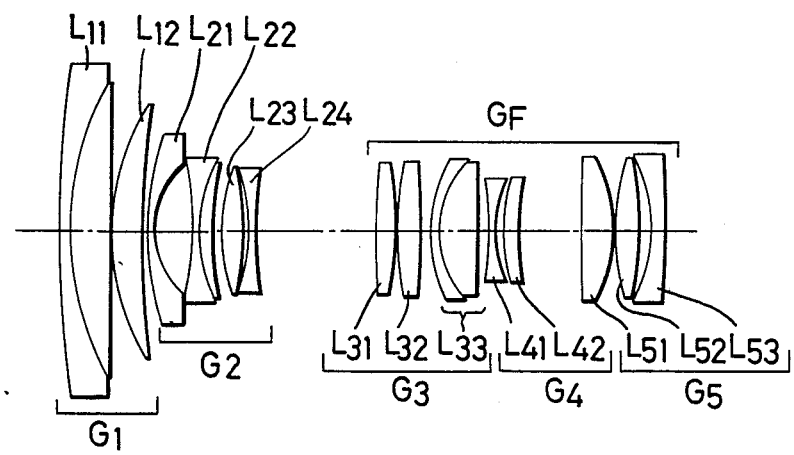
FIG. 8 shows the lens construction of the improved embodiment of the present invention.

This improved example, as shown in FIG. 8, is a five-unit lens having a focal length range of 28.8 mm-146 mm and an F-number of 4.1-5.7, and the power arrangement of the lens units and the functions thereof during focusing and zooming are similar to those shown in FIGS. 6A and 6B.

Figure 9:
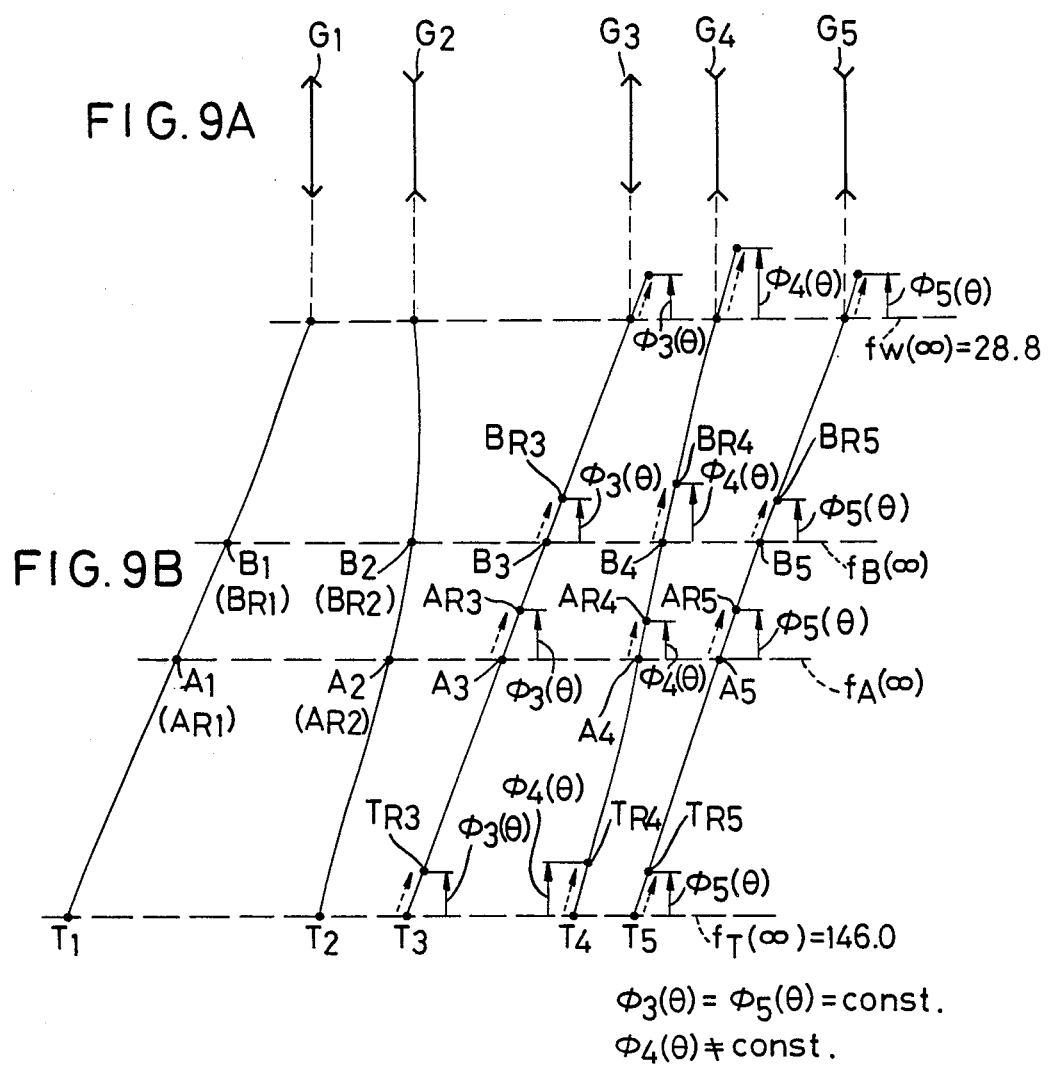
FIG. 9A shows the power arrangement of a zoom lens according to the improved embodiment of the present invention.
FIG. 9B is a developed view of a rotatable lens barrel in the improved embodiment of the present invention.

The specific form of movement of the improved example will now be described in detail with reference to FIG. 9B. FIG. 9B is a developed view of the rotatable lens barrel in the improved example, in which the solid lines indicate cam slots formed in the rotatable lens barrel. The vertical direction and the horizontal direction in FIG. 9B represents the angle of rotation and the position on the optic axis, as in FIG. 6B, and FIG. 9B corresponds to the movement locus of each lens unit. As in the embodiment of FIGS. 6A and 6B, all the lens units are moved on the optic axis during zooming, the first lens unit $G_1$ and the second lens unit $G_2$ are only move for zooming, and the third lens unit $G_3$, the fourth lens unit $G_4$ and the fifth lens unit $G_5$ are moved as the in-focus unit $G_F$ during focusing as well. In order that the lens system may be focused to an object at the photographing distance R from the infinity in-focus state in any focal length fA, the third lens unit $G_3$, the fourth lens unit $G_4$ and the fifth lens unit $G_5$ which have so far been at positions $A_3$, $A_4$ and $A_5$, respectively, are moved to Positions $A_{R3}$, $A_{R4}$ and $A_{R5}$, respectively, along their respective movement locuses for a magnification change. At this time, the first lens unit $G_1$ has its position on the optic axis fixed, and in FIG. 9B, this position is shown as a position $A_{R1}$ (the position on the optic axis is coincident with $A_1$), and likewise, the second lens unit $G_2$ has its position on the optic axis fixed, and in FIG. 9B, this position is shown as a position $A_{R2}$ (the position on the optic axis is coincident with $A_2$).

Also, in order that the lens system may be focused to the object at the photographing distance R from the infinity in-focus state in another focal length fB, the third lens unit $G_3$, the fourth lens unit $G_4$ and the fifth lens unit $G_5$ which have so far been positioned at $B_3$, $B_4$ and $B_5$, respectively, are moved to positions $B_{R3}$, $B_{R4}$ and $B_{R5}$, respectively, along their respective movement locuses, and the on-axis positions of the first lens unit $G_1$ and the second lens unit $G_2$ are fixed at positions $B_{R1}$ and $B_{R2}$ identical to $B_1$ and $B_2$. Of course, the design is made such that when with the photographing distance R fixed, zooming is effected along the movement locuses from the positions indicated by $A_{R1}$, $A_{R2}$, $A_{R3}$, $A_{R4}$ and $A_{R5}$ in FIG. 9B, the five lens units are moved to the positions indicated by $B_{R1}$, $B_{R2}$, $B_{R3}$, $B_{R4}$ and $B_{R5}$.

Likewise, when the composite focal length of the entire system is the longest focal length $f_T$ (telephoto end), the positions of the respective lens units are at $T_1$, $T_2$, $T_3$, $T_4$ and $T_5$ shown, and for the lens system to be focused to the object at the photographing distance R in this magnification-changed state, the third lens unit $G_3$, the fourth lens unit $G_4$ and the fifth lens unit $G_5$ as the in-focus unit $G_F$ can be moved to positions $T_{R3}$, $T_{R4}$ and $T_{R5}$, respectively, along their respective movement locuses for a magnification change.

The design is such that the amount of rotation $\phi$ of the rotatable lens barrel for imparting necessary movements to the third lens unit $G_3$ and the fifth lens unit $G_5$ as the in-focus unit in order that shift may be made from the infinity in-focus state in any magnification-changed state to the in-focus state with respect to a predetermined short distance object is always constant over the full magnification change range for a predetermined photographing distance R, while the amount of rotation $\phi_4$ required of the fourth lens unit varies for the predetermined photographing distance R in conformity with the value of $\theta$, i.e., the rotated position of the cam cylinder.

That is, in FIG. 9B: as $\phi_3(\theta) = \phi_5(\theta) =$ constant $\phi_4(\theta) \neq$ constant In FIG. 9B, as regards the movement locuses of the third lens unit $G_3$, the fourth lens unit $G_4$ and the fifth lens unit $G_5$, in order to secure the movement locuses necessary for focusing at the wide angle end (the composite focal length $f_W$ of the entire system), the locuses for the in-focus are extended along the movement locuses for a magnification change by amounts corresponding to $\phi_3(\theta)$, $\phi_4(\theta)$ and $\phi_5(\theta)$, respectively, and these extended portions provide the movement locuses exclusively for the in-focus.

As shown in the lens construction view of FIG. 8, the lens units in the present embodiment are constructed as follows. The first lens unit $G_1$ of positive refractive power comprises in succession from the object side, a cemented positive lens $L_{11}$ comprising a negative lens and a positive lens joined together, and a positive meniscus lens $L_{12}$ having its convex surface facing the object side, and the second lens unit $G_2$ of negative refractive power is comprised of a negative meniscus lens $L_{21}$ having its convex surface facing the object side, a cemented negative lens $L_{22}$ comprising a biconcave negative lens and a positive meniscus lens having its convex surface facing the object side joined together, a positive lens $L_{23}$ having its surface of sharper curvature facing the object side, and a negative lens $L_{24}$ having its surface of sharper curvature facing the object side. The third lens unit $G_3$ of positive refractive power is comprised of two positive lenses $L_{31}$ and $L_{32}$ and a cemented positive lens $L_{33}$ comprising a negative meniscus lens having its convex surface facing the object side and a positive lens having its surface of sharper curvature facing the object side joined together. The fourth lens unit $G_4$ of negative refractive power is comprised of a biconcave negative lens $L_{41}$ and a positive meniscus lens $L_{42}$ having its convex surface facing the object side, and the fifth lens unit $G_5$ of positive refractive power is comprised of a positive lens $L_{51}$ having its surface of sharper curvature facing the image side, a positive lens $L_{52}$ having its surface of sharper curvature facing the object side, and a negative lens $L_{53}$ having its surface of sharper curvature facing the object side.

The numerical data of the embodiment described above and shown in FIG. 8 are shown in Table 4 below. In the table, the numbers at the left end indicate the order from the object side, and the refractive indices and Abbe numbers are values for d-line ($\lambda = 587.6$ nm).

The movement locuses in the present embodiment are ones solved for the photographing distance $R = 1.5$ m. $d_5$ represents the spacing between the first lens unit $G_1$ and the second lens unit $G_2$, $d_{14}$ represents the spacing between the second lens unit $G_2$ and the third lens unit $G_3$, $d_{21}$ represents the spacing between the third lens unit $G_3$, $d_{21}$ and the fourth lens unit $G_4$, $d_{25}$ represents the spacing between the fourth lens unit $G_4$ and the fifth lens unit $G_5$, Bf represents the back focal length. Values at six positions in the focal length $f = 28.8 - 146.0$ mm are shown.

Also, the amounts of axial movement necessary for the respective lens units at the photographing distance $R = 1.5$ m, 2.0 m, 3.0 m, 5.0 m, 7.0 m, 10.0 m by the present embodiment are shown in Table 5 below. The amounts of axial movement at the respective photographing distances are determined from the movement locuses by the angle of rotation $\theta$ of the rotatable lens barrel for prescribing the amounts of movement of the respective lens units during zooming and a value $\phi_i(\theta, R)$ ($i = 3, 4, 5$) which depends on the photographing distance $R$.

In Table 5 below, the amount $\phi_i(\theta, R)$ corresponding to the angle of rotation of the rotatable lens barrel which prescribes the amount of movement for each photographing distance R is shown as a value for the total amount of rotation $\theta$ of the rotatable lens barrel necessary for the magnification change from the wide angle end to the telephoto end, and the then amount of movement $\Delta X_i$ along the optic axis is also shown. In Table 5, the case where the movement for the in-focus is on the object side is shown as the positive.

With regard to such an embodiment of the present invention, the amounts of displacement of the imaging point when a predetermined amount of axial movement has been imparted to each lens unit to focus the lens system to each photographing distance are shown in Table 6 below. It is seen from this Table 6 that the amounts of displacement of the imaging point at the respective focal lengths and photographing distances are very small and are sufficiently within the depth of focus.

TABLE 4

Focal length: $f = 28.8 \sim 146.0$
Field angle: $2\omega = 76.6 \sim 16.5°$
F-number: $4.1 \sim 5.7$

| No | Radius of curvature r | Center-thickness & spacing d | Refractive index n | Abbe number $\nu$ | |
|---|---|---|---|---|---|
| 1 | 243.846 | 1.900 | 1.86074 | 23.0 | $G_1$ |
| 2 | 64.913 | 7.900 | 1.61720 | 54.0 | |
| 3 | −966.969 | 0.100 | | | |
| 4 | 48.137 | 5.400 | 1.72000 | 50.3 | |
| 5 | 160.443 | variable | | | |
| 6 | 53.009 | 1.200 | 1.78797 | 47.5 | $G_2$ |
| 7 | 16.902 | 7.800 | | | |
| 8 | −67.538 | 1.100 | 1.78797 | 47.5 | |
| 9 | 28.182 | 2.300 | 1.86074 | 23.0 | |
| 10 | 51.522 | 2.300 | | | |
| 11 | 31.688 | 4.000 | 1.78472 | 25.8 | |
| 12 | −80.446 | 1.000 | | | |
| 13 | −39.394 | 1.000 | 1.77279 | 49.4 | |
| 14 | 73.669 | variable | | | |
| 15 | 121.643 | 3.600 | 1.48749 | 70.2 | $G_3$ |
| 16 | −61.082 | 0.100 | | | |
| 17 | 58.219 | 4.000 | 1.48749 | 70.2 | |
| 18 | −244.932 | 2.200 | | | |
| 19 | 30.508 | 1.300 | 1.80458 | 25.5 | |
| 20 | 16.141 | 8.000 | 1.62280 | 57.0 | |
| 21 | −213.435 | variable | | | |
| 22 | −66.796 | 1.200 | 1.79668 | 45.4 | $G_4$ |
| 23 | 30.075 | 1.200 | | | |
| 24 | 30.186 | 2.800 | 1.86074 | 23.0 | |
| 25 | 56.097 | variable | | | |
| 26 | 178.339 | 6.800 | 1.48749 | 70.2 | $G_5$ |
| 27 | −24.410 | 0.100 | | | |
| 28 | 47.492 | 4.800 | 1.51680 | 64.1 | |
| 29 | −65.021 | 2.200 | | | |
| 30 | −26.793 | 2.000 | 1.90265 | 35.8 | |
| 31 | −233.439 | Bf = variable | | | |

| f | $d_5$ | $d_{14}$ | $d_{21}$ | $d_{25}$ | Bf |
|---|---|---|---|---|---|
| 28.8 | 0.7417 | 23.4631 | 1.9772 | 12.1598 | 39.9197 |
| 35.0 | 4.8413 | 19.4813 | 3.1084 | 10.3333 | 43.5116 |
| 50.0 | 12.4422 | 13.6422 | 5.5748 | 7.3395 | 49.9110 |
| 70.0 | 19.2972 | 9.3221 | 7.6181 | 5.2374 | 57.3199 |
| 105.0 | 25.9537 | 4.8258 | 10.2655 | 3.3680 | 69.0158 |
| 146.0 | 29.1036 | 1.6972 | 12.0567 | 2.0924 | 85.7564 |

Focal lengths of lens units
1st lens unit $G_1$: $f_1 = 90.200$
2nd lens unit $G_2$: $f_2 = -16.700$
3rd lens unit $G_3$: $f_3 = 26.462$
4th lens unit $G_4$: $f_4 = 40.097$
5th lens unit $G_5$: $f_5 = 60.600$

TABLE 2

(Amount of axial movement of lens units for in-focus)
Unit: mm ($\phi_R/\Theta$ is $10^{-2}$)

| R | f | $G_1$ | $G_2$ | $G_3$ | $G_4$ | $G_5$ | |
|---|---|---|---|---|---|---|---|
| 1.5 m | 28.8 | 0.0000 | 0.0000 | 3.132 | 5.320 | 3.132 | $\phi_R/\Theta$ |
| | | | | −1.4354 | −1.4424 | −1.4542 | $\Delta X_i$ |
| | 35.0 | 0.0000 | 0.0000 | 3.132 | 5.073 | 3.132 | $\phi_R/\Theta$ |
| | | | | −1.4354 | −1.3638 | −1.5933 | $\Delta X_i$ |
| | 50.0 | 0.0000 | 0.0000 | 3.132 | 4.103 | 3.132 | $\phi_R/\Theta$ |
| | | | | −1.4354 | −1.0912 | −1.5072 | $\Delta X_i$ |
| | 70.0 | 0.0000 | 0.0000 | 3.132 | 2.474 | 3.132 | $\phi_R/\Theta$ |
| | | | | −1.4354 | −0.9619 | −1.4354 | $\Delta X_i$ |
| | 105.0 | 0.0000 | 0.0000 | 3.132 | 2.943 | 3.132 | $\phi_R/\Theta$ |
| | | | | −1.4354 | −1.1211 | −1.4354 | $\Delta X_i$ |
| | 146.0 | 0.0000 | 0.0000 | 3.132 | 3.367 | 3.132 | $\phi_R/\Theta$ |
| | | | | −1.4354 | −1.4354 | −1.4354 | $\Delta X_i$ |
| 2.0 m | 28.8 | 0.0000 | 0.0000 | 2.322 | 3.944 | 2.322 | $\phi_R/\Theta$ |

TABLE 2-continued (Amount of axial movement of lens units for in-focus)
Unit: mm ($\phi_R/\Theta$ is $10^{-2}$)

| R | f | $G_1$ | $G_2$ | $G_3$ | $G_4$ | $G_5$ | |
|---|---|---|---|---|---|---|---|
|  | 35.0 | 0.0000 | 0.0000 | −1.0643 | −1.1001 | −1.1207 | $\Delta X_i$ |
|  |  |  |  | 2.322 | 3.762 | 2.322 | $\phi_R/\Theta$ |
|  | 50.0 | 0.0000 | 0.0000 | −1.0643 | −0.9757 | −1.1413 | $\Delta X_i$ |
|  |  |  |  | 2.322 | 3.042 | 2.322 | $\phi_R/\Theta$ |
|  | 70.0 | 0.0000 | 0.0000 | −1.0643 | −0.8102 | −1.1107 | $\Delta X_i$ |
|  |  |  |  | 2.322 | 1.834 | 2.322 | $\phi_R/\Theta$ |
|  | 105.0 | 0.0000 | 0.0000 | −1.0643 | −0.7156 | −1.0608 | $\Delta X_i$ |
|  |  |  |  | 2.322 | 2.183 | 2.322 | $\phi_R/\Theta$ |
|  | 146.0 | 0.0000 | 0.0000 | −1.0643 | −0.8356 | −1.0700 | $\Delta X_i$ |
|  |  |  |  | 2.322 | 2.496 | 2.322 | $\phi_R/\Theta$ |
| 3.0 m | 28.8 | 0.0000 | 0.0000 | −1.0643 | −1.0646 | −1.0645 | $\Delta X_i$ |
|  |  |  |  | 1.531 | 2.600 | 1.531 | $\phi_R/\Theta$ |
|  |  |  |  | −0.7015 | −0.7524 | −0.7763 | $\Delta X_i$ |
|  | 35.0 | 0.0000 | 0.0000 | 1.531 | 2.479 | 1.531 | $\phi_R/\Theta$ |
|  |  |  |  | −0.7015 | −0.6295 | −0.7364 | $\Delta X_i$ |
|  | 50.0 | 0.0000 | 0.0000 | 1.531 | 2.005 | 1.531 | $\phi_R/\Theta$ |
|  |  |  |  | −0.7015 | −0.5361 | −0.7284 | $\Delta X_i$ |
|  | 70.0 | 0.0000 | 0.0000 | 1.531 | 1.209 | 1.531 | $\phi_R/\Theta$ |
|  |  |  |  | −0.7015 | −0.4721 | −0.6957 | $\Delta X_i$ |
|  | 105.0 | 0.0000 | 0.0000 | 1.531 | 1.439 | 1.531 | $\phi_R/\Theta$ |
|  |  |  |  | −0.7015 | −0.5527 | −0.7063 | $\Delta X_i$ |
|  | 146.0 | 0.0000 | 0.0000 | 1.531 | 1.645 | 1.531 | $\phi_R/\Theta$ |
|  |  |  |  | −0.7015 | −0.7020 | −0.7017 | $\Delta X_i$ |
| 5.0 m | 28.8 | 0.0000 | 0.0000 | 0.910 | 1.546 | 0.910 | $\phi_R/\Theta$ |
|  |  |  |  | −0.4171 | −0.4633 | −0.4833 | $\Delta X_i$ |
|  | 35.0 | 0.0000 | 0.0000 | 0.910 | 1.474 | 0.910 | $\phi_R/\Theta$ |
|  |  |  |  | −0.4171 | −0.3717 | −0.4345 | $\Delta X_i$ |
|  | 50.0 | 0.0000 | 0.0000 | 0.910 | 1.192 | 0.910 | $\phi_R/\Theta$ |
|  |  |  |  | −0.4171 | −0.3204 | −0.4317 | $\Delta X_i$ |
|  | 70.0 | 0.0000 | 0.0000 | 0.910 | 0.719 | 0.910 | $\phi_R/\Theta$ |
|  |  |  |  | −0.4171 | −0.2805 | −0.4115 | $\Delta X_i$ |
|  | 105.0 | 0.0000 | 0.0000 | 0.910 | 0.855 | 0.910 | $\phi_R/\Theta$ |
|  |  |  |  | −0.4171 | −0.3291 | −0.4193 | $\Delta X_i$ |
|  | 146.0 | 0.0000 | 0.0000 | 0.910 | 0.978 | 0.910 | $\phi_R/\Theta$ |
|  |  |  |  | −0.4171 | −0.4177 | −0.4172 | $\Delta X_i$ |
| 7.0 m | 28.8 | 0.0000 | 0.0000 | 0.648 | 1.100 | 0.648 | $\phi_R/\Theta$ |
|  |  |  |  | −0.2968 | −0.3350 | −0.3512 | $\Delta X_i$ |
|  | 35.0 | 0.0000 | 0.0000 | 0.648 | 1.049 | 0.648 | $\phi_R/\Theta$ |
|  |  |  |  | −0.2968 | −0.2644 | −0.3089 | $\Delta X_i$ |
|  | 50.0 | 0.0000 | 0.0000 | 0.648 | 0.848 | 0.648 | $\phi_R/\Theta$ |
|  |  |  |  | −0.2968 | −0.2285 | −0.3068 | $\Delta X_i$ |
|  | 70.0 | 0.0000 | 0.0000 | 0.648 | 0.512 | 0.648 | $\phi_R/\Theta$ |
|  |  |  |  | −0.2968 | −0.1994 | −0.2920 | $\Delta X_i$ |
|  | 105.0 | 0.0000 | 0.0000 | 0.648 | 0.609 | 0.648 | $\phi_R/\Theta$ |
|  |  |  |  | −0.2968 | −0.2343 | −0.2980 | $\Delta X_i$ |
|  | 146.0 | 0.0000 | 0.0000 | 0.648 | 0.696 | 0.648 | $\phi_R/\Theta$ |
|  |  |  |  | −0.2968 | −0.2973 | −0.2969 | $\Delta X_i$ |
| 10.0 m | 28.8 | 0.0000 | 0.0000 | 0.452 | 0.825 | 0.452 | $\phi_R/\Theta$ |
|  |  |  |  | −0.2071 | −0.2368 | −0.2492 | $\Delta X_i$ |
|  | 35.0 | 0.0000 | 0.0000 | 0.452 | 0.732 | 0.452 | $\phi_R/\Theta$ |
|  |  |  |  | −0.2071 | −0.1847 | −0.2157 | $\Delta X_i$ |
|  | 50.0 | 0.0000 | 0.0000 | 0.452 | 0.592 | 0.452 | $\phi_R/\Theta$ |
|  |  |  |  | −0.2071 | −0.1598 | −0.2140 | $\Delta X_i$ |
|  | 70.0 | 0.0000 | 0.0000 | 0.452 | 0.357 | 0.452 | $\phi_R/\Theta$ |
|  |  |  |  | −0.2071 | −0.1391 | −0.2034 | $\Delta X_i$ |
|  | 105.0 | 0.0000 | 0.0000 | 0.452 | 0.425 | 0.452 | $\phi_R/\Theta$ |
|  |  |  |  | −0.2071 | −0.1635 | −0.2077 | $\Delta X_i$ |
|  | 146.0 | 0.0000 | 0.0000 | 0.452 | 0.486 | 0.452 | $\phi_R/\Theta$ |
|  |  |  |  | −0.2071 | −0.2075 | −0.2072 | $\Delta X_i$ |

TABLE 6

(Amount of displacement of the imaging point)
Unit: mm

| f | R | | | | | |
|---|---|---|---|---|---|---|
|  | 1.5 m | 2.0 m | 3.0 m | 5.0 m | 7.0 m | 10.0 m |
| 28.8 | −0.0021 | −0.0397 | −0.0575 | −0.0516 | −0.0425 | −0.0328 |
| 35.0 | 0.0000 | 0.0214 | 0.0173 | 0.0073 | 0.0034 | 0.0013 |
| 50.0 | 0.0000 | −0.0333 | −0.0463 | −0.0401 | −0.0325 | −0.0248 |
| 70.0 | 0.0000 | −0.0342 | −0.0435 | −0.0352 | −0.0278 | −0.0208 |
| 105.0 | 0.0000 | −0.0174 | −0.0225 | −0.0184 | −0.0146 | −0.0110 |
| 146.0 | 0.0000 | 0.0000 | 0.0000 | 0.0000 | 0.0000 | 0.0000 |

In the above described embodiment, the values of the amounts of movement $\phi$ of the third lens unit $G_3$ and the fifth lens unit $G_5$ along their respective movement locuses are constant for the same photographing distance R irrespective of the focal length, whereas the necessary amount of movement φ of the fourth lens unit $G_4$ for a predetermined photographing distance differs from those of the third lens unit $G_3$ and the fifth lens unit $G_5$. Which of the third, fourth and fifth lens units $G_3$, $G_4$ and $G_5$ as the in-focus lens unit is made to have an amount of rotation different from those of the other lens units is arbitrary. It is also possible to make such a design that the amounts of rotation of the respective lens units in the in-focus lens unit for the in-focus for a predetermined photographing distance differ from one another. By adopting such a design that the amounts of movement of the respective lens units moved for the in-focus differ from one another, the amounts of rotation along the movement locuses for a magnification change can be suitably selected for the amounts of movement on the optic axis necessary for the respective lens units in the in-focus lens unit, and this leads to the advantage that the degree of freedom of designing is enhanced.

Figure 10:
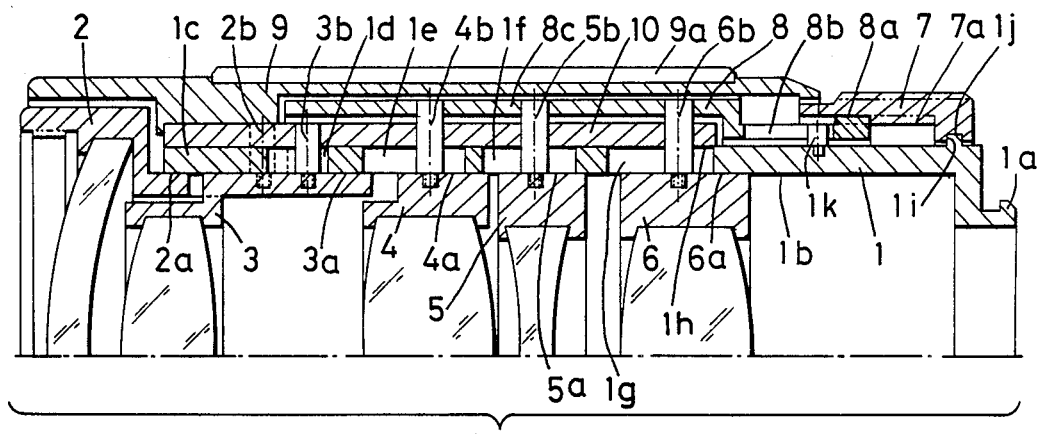
FIG. 10 is a longitudinal cross-sectional view of the lens barrel of the present invention on the short focus side thereof.
Figure 11:
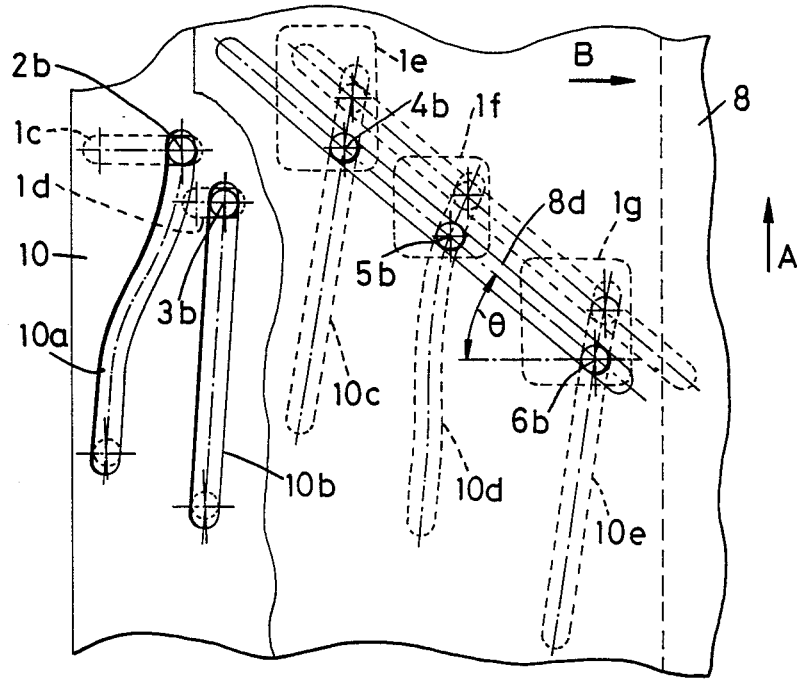
FIG. 11 is a developed view of the essential portions of FIG. 10.

FIG. 10 which shows the specific construction of the lens barrel of the five-group lens of the present invention is a longitudinal cross-sectional view of a zoom lens barrel L, and in this case, it shows the state of the wide side, i.e., the short focus side. FIG. 11 is a developed view of the barrel showing the configurations of a cam slot and a guide slot. The fixed barrel 1 has a mount portion 1a engageable with the mount on the camera body side, and on that end of the bore portion 1b thereof which is adjacent to the object side, the small-diametered portion 2a of a holding frame 2 for a first lens unit is fitted for sliding movement in the direction of the optic axis. On the bore portion 1b, in succession from the object side end toward the mount portion 1a, the outer peripheral portion 3a of a holding frame 3 for a second lens unit, the outer peripheral portion 4a of a holding frame 4 for a third lens unit, the outer peripheral portion 5a of a holding frame 5 for a fourth lens unit and the outer peripheral portion 6a of a holding frame 6 for a fifth lens unit are fitted for sliding movement in the direction of the optic axis and for rotation about the optic axis.

In the central portion of the fixed barrel 1, a guide slot 1c for guiding a pin 2b provided on the outer peripheral surface of the holding frame 2 in the direction of the optic axis and a guide slot 1d for guiding a pin 3b provided on the outer peripheral surface of the holding frame 3 in the direction of the optic axis are provided parallel to the optic axis, and further, from the central portion toward the mount portion 1a, a pin 4b provided on the outer peripheral surface of the holding frame 4, a pin 5b provided on the outer peripheral surface of the holding frame 5 and a pin 6b provided on the outer peripheral surface of the holding frame 6 are disposed in escape holes 1e, 1f and 1g, respectively, for leaving a margin to the movement of the respective pins. Also, on the outer peripheral portion 1h of the fixed barrel 1, a cam ring 10 having cam slots 10a–10e therein is fitted for rotation about the optic axis. An annular projection 1j is provided on the outer peripheral portion 1i of the fixed barrel 1 which is more adjacent to the mount, and on this projection 1j, a manual focus ring 7 is fitted and held for rotation about the optic axis.

An internal helicoid 7a is provided on the bore portion of the manual focus ring 7 and in meshing engagement with an external helicoid 8a provided on the outer peripheral surface of small diameter of a focus ring 8 which is adjacent to the mount. A guide slot 8b parallel to the optic axis is provided in that portion of the external helicoid 8a of the focus ring 8 which is adjacent to the object, and a pin 1k provided on the outer peripheral portion 1i of the fixed barrel 1 fits into the guide slot 8b and accordingly, this pin 1k is engaged with the guide slot 8b and therefore, the focus ring 8 is not rotatable but is movable only in the direction of the optic axis. The focus ring 8 has a cylindrical portion 8c of large diameter extending in the direction of the optic axis toward the object, and a lead slot 8d is formed in the cylindrical portion 8c. The lead slot 8d, when developed as shown in FIG. 11, has an angle θ with respect to the direction of the optic axis. The pins 4b, 5b and 6b provided on the outer peripheral surfaces of the aforementioned holding frames 4, 5 and 6, respectively, fit in the lead slot 8d.

A cam ring 10 is fitted between the fixed barrel 1 and the cylindrical portion 8c of the focus ring 8, and the inner peripheral portion of a zoom ring 7 is secured to the outer peripheral portion of the cam ring 10 which is toward the object. Accordingly, the zoom ring 9 and the cam ring 10 are rotatable apparently as a unit. An anti-slip rubber ring 9a is mounted on the outer peripheral portion of the zoom ring 9.

Figure 12:
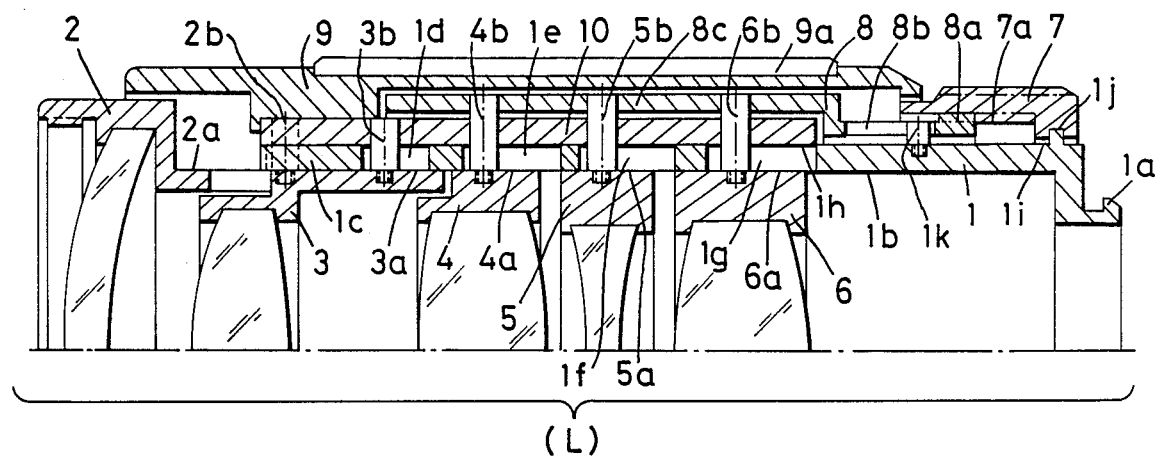
FIG. 12 is a longitudinal cross-sectional view of the lens barrel of the present invention on the long focus side thereof.
Figure 13:
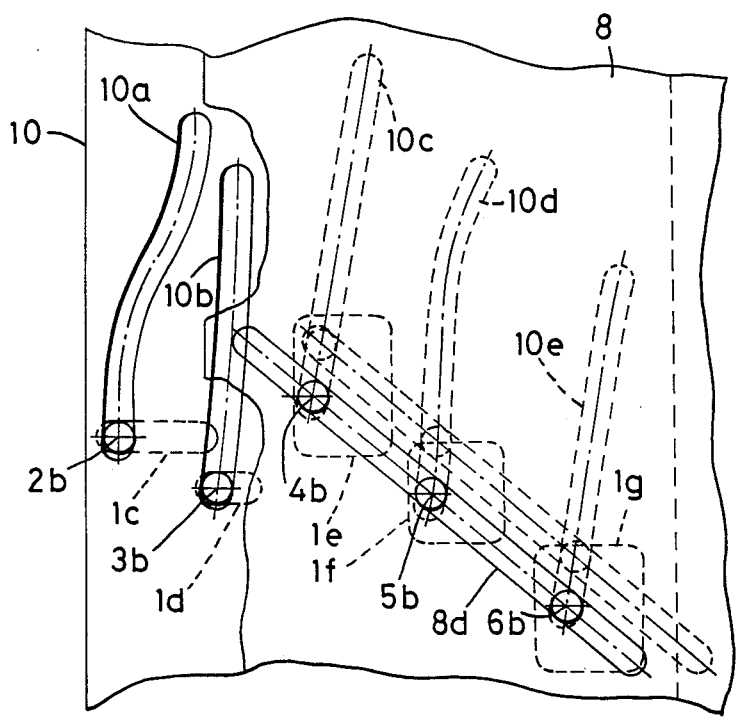
FIG. 13 is a developed view of the essential portions of FIG. 12.

The operation of the zoom lens barrel of the above-described construction will hereinafter be described. FIG. 12 is a longitudinal cross-sectional view showing the state of the long focus side of the barrel L, and FIG. 13 is a developed view of the essential portions of FIG. 12.

To shift from the state of FIG. 10 showing the state of the short focus side to the long focus side, the zoom ring 9 is rotated counter-clockwise as viewed from the object side. If this is done, the cam ring 10 is rotated in the direction of arrow A in FIG. 11. At this time, the pin 2b provided on the outer peripheral surface of the holding frame 2 does not rotate but moves only in the direction of the optic axis, due to the actions of the cam slot 10a formed in the cam ring 10 and the guide slot 1c formed in the fixed barrel 1. Likewise, the pin 3b provided on the outer peripheral surface of the holding frame 3 does not rotate but moves in the direction of the optic axis due to the actions of the cam slot 10b formed in the cam ring 10 and the guide slot 1d formed in the fixed barrel 1. As a result of the above-described operation, the holding frames 2 and 3 moves by a predetermined amount along the optic axis by the zoom ring 9 being rotated. Accordingly, the first lens unit and the second lens unit also move in the direction of the optic axis.

The pin 4b provided on the outer peripheral surface of the holding frame 4 is engaged with the cam slot 10c in the cam ring 10 and the lead slot 8d and therefore moves in the direction of the optic axis while rotating along the lead slot 8d. Accordingly, the holding frame 4 performs an operation similar to that of the pin 4b. The holding frames 5 and 6 also perform an operation similar to that of the holding frame 4 because the pins 5b and 6b thereof are engaged with cam slots 10d and 10e formed in the cam ring 10 and the lead slot 8d formed in the focus ring 8. Accordingly, the third to fifth lens units also move in the direction of the optic axis. The focus ring 8 is movable only in the direction of the optic axis and not rotatable, due to the pin 1k provided on the fixed barrel 1 and the guide slot 8b formed in the focus ring 8 and parallel to the optic axis.

Description will now be made of the focus adjusting operation in the zoom lens barrel of the present embodiment. When the manual focus ring 7 is first rotated from the state of FIG. 10, the focus ring 8 moves along the optic axis in the direction of arrow B in FIG. 11 because the internal helicoid 7a provided on the bore portion of the manual focus ring is in meshing engagement with the external helicoid 8a provided on the outer peripheral surface of the focus ring 8 and because of the engagement between the pin 1k provided on the outer peripheral surface of the fixed barrel 1 and the guide slot 8b formed in the focus ring 8. When the focus ring 8 moves in the direction of arrow B the lead slot 8d in the focus ring 8 having an angle $\theta$ with respect to the optic axis also moves in the direction of arrow B and the pins 4b, 5b and 6b provided on the outer peripheral surfaces of the holding frames 4, 5 and 6 move in the direction of arrow B while rotating along the cam slots 10c, 10d and 10e, respectively, in the cam ring 10, with a result that the holding frame 4, 5 and 6 likewise move to thereby accomplish focus adjustment.

To adopt an automatic focus adjusting mechanism in the zoom lens barrel of the present embodiment, of course, an internal gear may be provided in the bore portion of the manual focus ring 7 and the manual focus ring 7 may be rotated by a motor provided in the camera body or the like through the internal gear.

Also, in the present embodiment, the pins 4b, 5b and 6b of the holding frames 4, 5 and 6 are all fitted in the single guide slot 8d having an angle $\theta$ with respect to the optic axis, but, alternatively, a plurality of guide slots corresponding to the number of pins may be provided so that the pins may be fitted in the respective guide slots. In such case, the angles of inclination of the plurality of guide slots can be changed. Further, the guide slots can be configured like cam slots.

We claim:

1. A zoom lens including:
   (a) a plurality of lens units movable along an optic axis; and
   (b) means for prescribing the movements of said plurality of lens units along the optic axis for adjusting the focal length of said zoom lens with a desired range;
      at least one of said plurality of lens units also being moved along the optic axis to form the image of an object lying at any distance from said zoom lens on a predetermined surface, said means having a member formed with a slot for each of the last-mentioned lens units, respectively, which prescribes the movement of that lens unit along the optic axis, each of the last-mentioned lens units being moved only in accordance with its said slot both when it is moved along the optic axis to change the focal length of said zoom lens and when it is moved along the optic axis to form the image of the object on said predetermined surface.

2. A zoom lens according to claim 1, wherein said member is provided for rotation about the optic axis, and said at least one lens unit is moved along the optic axis with rotation of said member.

3. A zoom lens including:
   (a) a plurality of lens units movable along an optic axis; and
   (b) means for prescribing the movements of said plurality of lens units along the optic axis for adjusting the focal length of said zoom lens within a desired range:
      at least one of said plurality of lens units being moved along the optic axis to form the image of an object lying at any distance from said zoom lens on a predetermined surface, said means having a member formed with at least one slot which prescribes the movement of said at least one lens unit along the optic axis, said at least one lens unit being moved in accordance with said at least one slot both when it is moved along the optic axis to change the focal length of said zoom lens and when it is moved along the optic axis to form the image of the object on said predetermined surface, wherein said member is provided for rotation about the optic axis, and said at least one lens unit is moved along the optic axis with rotation of said member, and wherein said plurality of lens units have three lens units movable along the optic axis to form the image of the object on the predetermined surface, said three lens units do not include one of said plurality of lens units which is most adjacent to the object side, and said member is formed with three slots corresponding to said three lens units.

4. A zoom lens according to claim 3, wherein the angles of rotation of said member corresponding to the amounts of displacement of said three lens units from a position on the optic axis for forming the image of any object on said predetermined surface to a position on the optic axis for forming the image of another object on said predetermined surface are set substantially equal to one another.

5. A zoom lens according to claim 4, wherein said plurality of lens units are comprised of five lens units, and two of said five lens units except said three lens units are moved along the optic axis only when the focal length of said zoom lens is changed.

6. A zoom lens according to claim 3, wherein the angles of rotation of said member corresponding to the amounts of displacement of two of said three lens units from a position on the optic axis for forming the image of any object on said predetermined surface to a position on the optic axis for forming the image of another object on said predetermined surface are set substantially equal to each other, and the angle of rotation of said member corresponding to the amount of displacement of the remaining one of said three lenses from the position on the optic axis for forming the image of said any object on said predetermined surface to the position on the optic axis for forming the image of said another object on said predetermined surface is set so as to differ from the aforesaid angles of rotation of said member.

7. A zoom lens according to claim 6, wherein the amount of displacement of said remaining lens unit from the position on the optic axis for forming the image of said any object on said predetermined surface to the position on the optic axis for forming the image of said another object on said predetermined surface varies with a variation in the focal length of said zoom lens.

8. A zoom lens according to claim 6, wherein said plurality of lens units are comprised of five lens units, and two of said five lens units except said three lens units are moved along the optic axis only when the focal length of said zoom lens is changed.

9. A zoom lens including:
   (a) a plurality of lens units movable along an optic axis; and
   (b) means for prescribing the movements of said plurality of lens units along the optic axis for adjusting the focal length of said zoom lens within a desired range:

at least one of said plurality of lens units being moved along the optic axis to form the image of an object lying at any distance from said zoom lens on a predetermined surface, said means having a member formed with at least one slot which prescribes the movement of said at least one lens unit along the optic axis, said at least one lens unit being moved in accordance with said at least one slot both when it is moved along the optic axis to change the focal length of said zoom lens and when it is moved along the optic axis to form the image of the object on said predetermined surface, wherein said member is provided for rotation about the optic axis, and said at least one lens unit is moved along the optic axis with rotation of said member, and wherein said plurality of lens units have two lens units movable along the optic axis to form the image of the object on said predetermined surface, said two lens units do not include one of said plurality of lens units which is most adjacent to the object side, and the angles of rotation of said member corresponding to the amounts of displacement of said two lens units from a position on the optic axis for forming the image of any object on said predetermined surface to a position on the optic axis for forming the image of another object on said predetermined surface are set substantially equal to each other.

10. A zoom lens including:
(a) a plurality of lens units movable along an optic axis; and
(b) means for prescribing the movements of said plurality of lens units along the optic axis for adjusting the focal length of said zoom lens within a desired range:
    at least one of said plurality of lens units being moved along the optic axis to form the image of an object lying at any distance from said zoom lens on a predetermined surface, said means having a member formed with at least one slot which prescribes the movement of said at least one lens unit along the optic axis, said at least one lens unit being moved in accordance with said at least one slot both when it is moved along the optic axis to change the focal length of said zoom lens and when it is moved along the optic axis to form the image of the object on said predetermined surface, wherein said member is provided for rotation about the optic axis, and said at least one lens unit is moved along the optic axis with rotation of said member, and wherein said plurality of lens units have two lens units movable along the optic axis to form the image of the object on said predetermined surface, said two lens units do not include one of said plurality of lens units which is most adjacent to the object side, and the angles of rotation of said member corresponding to the amounts of displacement of said two lens units from a position on the optic axis for forming the image of any object on said predetermined surface to a position on the optic axis for forming the image of another object on said predetermined surface are set so as to differ from each other.

11. An improvement in a zoom lens, including:
a plurality of lens units, at least some of which are moved along predetermined individual locuses to change the focal length of said zoom lens and at least one of which is also moved along its individual locus to form the image of an object on a predetermined surface, the movement of each lens unit moved for both the changing of the focal length of said zoom lens and the forming of an image of an object being prescribed only by its individual locus.

* * * * *